Patented Aug. 14, 1923.

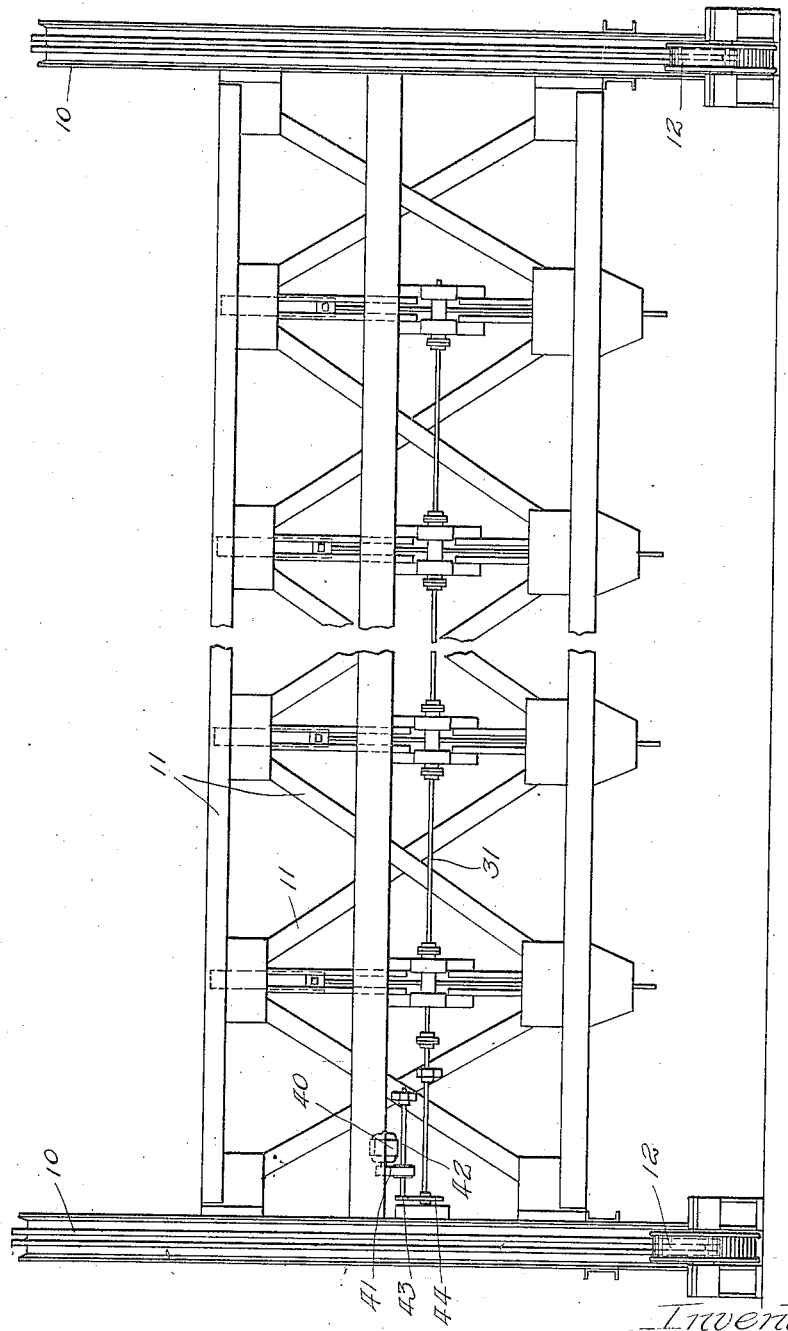

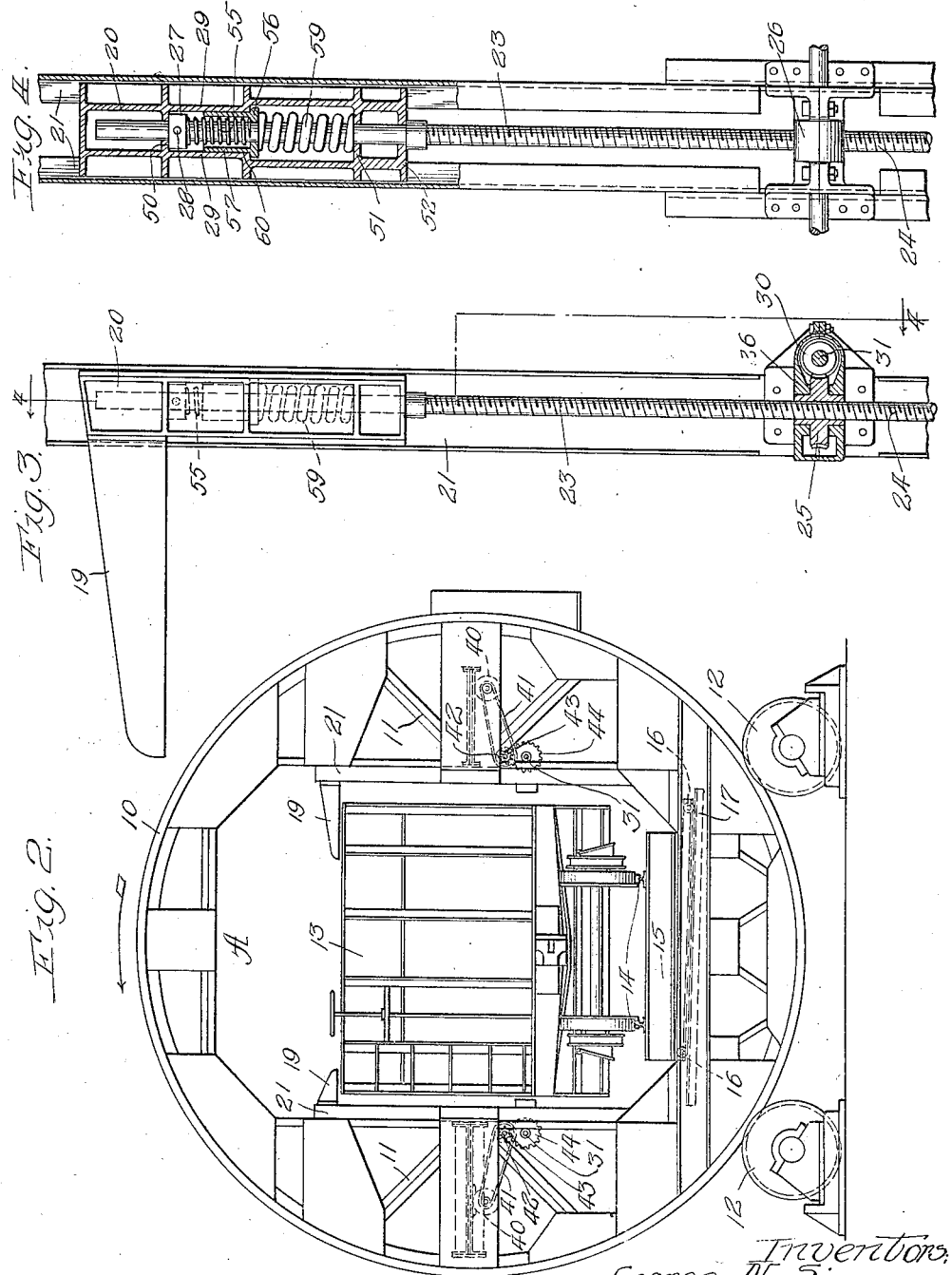

1,465,006

UNITED STATES PATENT OFFICE.

GEORGE N. SIMPSON AND ARTHUR M. SIMPSON, OF CHICAGO, ILLINOIS.

CAR-HOLDING MECHANISM.

Application filed August 5, 1921. Serial No. 489,943.

*To all whom it may concern:*

Be it known that we, GEORGE N. SIMPSON and ARTHUR M. SIMPSON, citizens of the United States, residing at Chicago, in the county of Cook and State of Illinois, have invented a new and useful Improvement in Car-Holding Mechanism, of which the following is a specification.

Our invention relates to improvements in car holding mechanism. It is especially adapted for use in connection with any apparatus in which a car of any kind is dumped by causing it to be inverted or partly inverted; and is so designed as to hold a car firmly clamped on the rails during the dumping operation. We have shown the invention in use on a rotary dump comprising a substantially cylindrical cage rotatably mounted and adapted to be rotated to dump a car in position inside of the cage. It is obvious, however, that without detracting from the spirit of our invention, the same mechanism or similar mechanism embodying the principles of our invention may be used in connection with any kind of dumping apparatus to hold a car on the rails during the dumping operation. The advantages and objects of our invention will appear as we proceed with our specification.

In that form of device embodying the features of our invention shown in the accompanying drawings, Figure 1 is a view in side elevation of a rotary dump, with a part broken away, and having our car holding mechanism arranged thereon, Fig. 2 is a vertical sectional view of the dump shown in Fig. 1, Fig. 3 is a vertical sectional view on an enlarged scale of one of the hooks used in connection with the holding down mechanism, and Fig. 4 is a view taken as indicated by the line 4 of Fig. 3.

As shown in the drawings A indicates in general a substantially cylindrical cage having ring members 10 at its ends which are suitably connected and braced by struts, braces and framing 11 in any suitable manner in order to make a rigid structure. The rings 10 are supported on rollers 12, and suitable flanges are provided to prevent endwise displacement. In this manner the entire cage A is supported by the rollers 12 and rotatably mounted. The center of the cage A is sufficiently free from bracing and the like in order to permit a car such as is indicated by 13 to enter the cage. The car 13 rests on the rails 14 supported in the cage on ties 15, which are connected together in any suitable manner, and supported on rollers 16 adapted to roll on transversely arranged sections of track 17. This arrangement permits the track 14 a certain amount of sideways movement in the cage A, in the manner of a rolling platen. At one end of the rotatable cage A is arranged a stationary receiving track and at the other end a stationary discharge track, and having their rails lying in alinement with the rails 14 in the cage, when the cage is in its normal upright position, so that the car, such as is represented by 13, can be run from the stationary receiving track into the cage, then dumped by causing rotation of the cage, and then run out of the cage onto the stationary discharge track, after the cage has again resumed its normal upright position. Any ordinary means may be used for rotating the cage. The construction of the cage itself, the means for and manner of rotating it and the particular construction of the rolling platen form no part of the present invention, and are not shown in detail in this specification. They may be of any desired construction. The rolling platen construction referred to, is well known in the art in connection with rotary dumps of the kind disclosed in this specification. This construction is for the purpose of permitting a slight sideways movement of the car at the start of the rotation of the cage, so that the body of the car will rest firmly against one side of the cage. The cars adapted to be dumped by the kind of cage shown ordinarily vary in width and consequently the space in the cage to accommodate the car is made somewhat wider than the average car, in order to permit the car to freely enter. The rolling platen, or construction permitting the sideways movement of the track in the cage, is provided so that as soon as the dump starts to rotate the car will move over to one side of the space in the cage and rest against such side.

Means are also provided for holding the car 13 firmly down on the rails 14 during the dumping operation. This holding down mechanism forms the subject matter of our present invention and will be described more in detail.

The holding down mechanism comprises a series of bars or hooks 19 projecting over the upper edge of the car body on each side of the cage. Since all of the hooks 19 are similarly arranged and mounted, we will describe in detail the construction and operation of but one. The hook 19 projects at right angles from a vertically arranged casting 20, sildably mounted in a vertical slide 21 at the side of the cage. The casting 20 and hook 19 mounted thereon are adapted to be pulled downwardly in the slide 21 by the rod 23. The downward movement of the rod 23 is effected in the following manner. The lower end of the rod 23 is threaded as indicated by 24 and has mounted thereon a gear wheel 25 which in turn is housed in a housing 26 to prevent vertical movement thereof. The rod 23 is prevented from rotating by any suitable means such as a square collar 27 pinned onto the rod 23 by means of a pin 28 and prevented from rotating by the webs 29 forming a part of the casting 20. Although the collar 27 is prevented from rotating in the casting 20, it nevertheless is free to slide upwardly and downwardly in the space between the two webs 29. It is obvious that rotation of the gear wheel 25 in one direction will cause downward movement of the rod 23, and rotation in the opposite direction will cause upward movement. Rotation of the gear wheel 25 is effected by a worm 30 meshing therewith and mounted on a shaft 31. There are two shafts 31 one on each side of the cage to operate all the hooks 19 on the corresponding side. Rotation to each of the shafts 31 may be given in any desired manner in order to cause the required movement of the hooks on that side. We have shown one of the shafts 31 adapted to be rotated by a small motor 40 connected by a belt 41 to the countershaft 42 which has on its end a pinion 43 meshing with a pinion 44 on the end of the shaft 31.

We will now describe in detail the manner of connecting the rod 23 to the casting 20. The casting 20 is formed with horizontal webs 50, 51 and 52 as shown in Fig. 4 of the drawings, through which webs holes are made to act as guides for the rod 23 which extends upwardly through such holes. Mounted on the rod 23 just below the web 50 is the square collar 27 described above. Mounted on the rod 23 below the collar 27 is a relatively light spiral spring 55. Below the spiral spring 55 is a sliding collar 56 on the rod 23, having a sleeve 57 extending upwardly and surrounding the spring. Below the collar 56 and above the web 51 is a relatively heavy spiral spring 59 on the rod 23. A shoulder 60 is formed in the casting 20 just above the collar 56 and projects inwardly enough to prevent movement of said collar 56 upwardly beyond such shoulder. The sleeve 57, however, is sufficiently small to pass the shoulder, and extends upwardly beyond the same. Reference to Fig. 4 of the drawings shows that by this construction, the rod 23 is permitted a certain amount of downward motion with respect to the casting 20, to compress the springs 55 and 59. In other words, if the hook 19 and casting 20 are prevented from moving downwardly, and a downward pull is exerted on the rod 23, the springs 55 and 59 will be compressed. It is obvious also that since the spring 55 is relatively lighter than the spring 59, such spring 55 will be compressed first until the collar 27 engages the upper end of the sleeve 57, whereupon further downward movement of the rod 23 and the collar 27 will cause downward movement of the sleeve 57 and collar 56 to compress the spring 59.

The purpose of this spring connection between the hook 19 and the rod 23, is to permit a certain amount of relative movement between the hook 19 and the rod 23. The operation is as follows. The car 13 is mounted on springs interposed between the car body and trucks in the usual manner. When the car 13 is loaded and run into the cage before dumping, these springs are compressed. After the dumping operation when the car is unloaded, the springs on the car between the car body and trucks are consequently expanded with the result that the car body is higher than it was before the dumping operation when loaded. It is obvious that if no provision was made for this rise of the car body, the hooks 19 would be held so tight after the car was unloaded by upward pressure of the car body caused by the springs on the car, that the sides of the car body might be injured and parts would become bound and make release of the hooks difficult. In other words, the upward pressure of the springs on the car transmitted through the car body against the hooks 19 would pull upwardly so strongly on the rods 23 that the gear wheels 25 would be bound against their bearings to such an extent as to make rotation of them almost impossible by the releasing mechanism; and the pressure of the hooks on the edges of the car body would be likely to cause injury. The spring 55 is provided to compensate for this upward movement of the car body. The spring 55 has sufficient tension so that it will not be materially compressed when the hooks are brought down against the car body. It will be noted that the rod 31 is operated by the counter shaft 42, which in turn is driven by the belt 41 and connected to the motor 40. The belt 41 is sufficiently loose or the motor 40 is made so small that when the hooks 19 engage the top of the car body, the motor will be stopped or the belt 41 will slip, before the spring 55 is materially compressed. After the car is dumped, and the cage A returned to its normal upright position, the springs on the car will be expanded as stated before. This expansion of the springs on the car will raise the car body, consequently raising the hooks 19 and compressing the spring 55. The spring 55 is of sufficient length, and there is sufficient distance between the upper end of the sleeve 57 and the collar 27 to permit full upward movement of the car body without bringing the upper end of the sleeve 57 into contact with the collar 27. It will be noted therefore that after the car body has thus risen, the only tension that will be on the rods 23 and the gear wheels 25 will be that caused by the springs 55. The springs 55 are light enough so that this tension will not bind or lock the gear wheels 25. It will be seen therefore that by this construction the springs 55 will permit the desired upward movement of the car body without locking or binding any of the parts.

It will be noted that a relatively heavy spring 59 is provided below the collar 56. The purpose of this spring is to take the weight of the car when the cage A is in an inverted position. When in such an inverted position, the weight of the car will rest on the hooks 19. This will cause first complete compression of the springs 55, since they are relatively light and will bring the ends of the sleeves 57 against the collars 27, thus preventing further compression of injury to the springs 55. After this the weight of the car will cause compression of the springs 59 which are heavy enough to take the weight of the car and support it resiliently, thus preventing injury to the parts by having so much weight supported upon them without interpositioning of the springs.

While we have shown and described certain embodiments of our invention, it is to be understood that it is capable of many modifications. Changes therefore in the construction and arrangement may be made without departing from the spirit and scope of the invention as disclosed in the appended claims, in which it is our intention to claim all novelty inherent in our invention as broadly as possible in view of the prior art.

What we claim as new:

1. A car holding mechanism comprising a hook adapted to be moved from a raised position above a car body to a lowered position in engagement with a car body, operating means for moving the hook from its raised position to its lowered position, and elastic means interposed between the hook and the operating means, said elastic means comprising a relatively stiff spring and a relatively weak spring.

2. A car holding mechanism comprising a hook adapted to be moved from a raised position above a car body to a lowered position in engagement with a car body, operating means for moving the hook from its raised position to its lowered position, and elastic means interposed between the hook and the operating means, said elastic means comprising a relatively stiff spring and a relatively weak spring arranged in series.

3. A car holding mechanism comprising a hook adapted to be moved from a raised position above a car body to a lowered position in engagement with a car body, a rod adapted for moving said hook, and spring means interposed between said rod and said hook, said spring means comprising a relatively weak spring and a relatively stiff spring.

4. A car holding mechanism comprising a hook adapted to be moved from a raised position above a car body to a lowered position in engagement with a car body, a rod adapted for moving said hook, and spring means interposed between said rod and said hook, said spring means comprising a relatively weak spring and a relatively stiff spring arranged in series.

5. A car holding mechanism comprising a hook adapted to be moved from a raised position above a car body to a lowered position in engagement with a car body, a rod adapted for moving said hook, and spring means interposed between said rod and said hook, said spring means comprising a relatively weak spring and a relatively stiff spring on said rod.

6. A car holding mechanism comprising a hook adapted to be moved from a raised position above a car body to a lowered position in engagement with a car body, a rod adapted for moving said hook, and spring means interposed between said rod and said hook, said spring means comprising a relatively weak spring and a relatively stiff spring arranged in series on said rod.

In witness whereof we have hereunto set our hands and seals this 23 day of June, 1921.

GEORGE N. SIMPSON. [L. S.]
ARTHUR M. SIMPSON. [L. S.]